US008200814B2

(12) United States Patent
Musman et al.

(10) Patent No.: US 8,200,814 B2
(45) Date of Patent: *Jun. 12, 2012

(54) SYSTEM AND METHOD FOR ANALYZING AND COORDINATING SERVICE-LEVEL-AGREEMENTS (SLA) FOR APPLICATION-SERVICE-PROVIDERS (ASP)

(75) Inventors: Lior Musman, Tel Aviv (IL); Arye Barkan, Ramat Aviv (IL); Aviv Freidin, Rishon-Lezion (IL); Noam Rotem, Modin (IL); Dror Treves, Tel Aviv (IL); Gal Baram, Ramat Gan (IL); Sharon Wagner, Netanya (IL)

(73) Assignee: CA, Inc., Islandia, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/796,424

(22) Filed: Jun. 8, 2010

(65) Prior Publication Data
US 2010/0281167 A1    Nov. 4, 2010

Related U.S. Application Data

(60) Continuation of application No. 11/105,526, filed on Apr. 14, 2005, now Pat. No. 7,734,765, and a division of application No. 09/714,204, filed on Nov. 17, 2000, now Pat. No. 6,925,493.

(51) Int. Cl.
*G06F 15/173* (2006.01)
(52) U.S. Cl. .......................... 709/224; 709/223; 709/226
(58) Field of Classification Search .................. 709/223, 709/224, 226; 705/11
See application file for complete search history.

(56) References Cited

U.S. PATENT DOCUMENTS

| | | | |
|---|---|---|---|
| 5,893,905 A * | 4/1999 | Main et al. | 705/11 |
| 6,792,456 B1 * | 9/2004 | Hellerstein et al. | 709/224 |
| 6,842,737 B1 | 1/2005 | Stiles et al. | 705/6 |
| 6,854,014 B1 | 2/2005 | Amin et al. | 709/227 |
| 6,885,641 B1 | 4/2005 | Chan et al. | 370/252 |
| 6,895,382 B1 | 5/2005 | Srinivasan et al. | 705/7 |
| 6,925,493 B1 * | 8/2005 | Barkan et al. | 709/224 |
| 7,003,560 B1 | 2/2006 | Mullen et al. | 709/223 |
| 7,058,704 B1 * | 6/2006 | Mangipudi et al. | 709/223 |
| 7,139,999 B2 | 11/2006 | Bowman-Amuah | 717/101 |
| 7,145,898 B1 | 12/2006 | Elliott | 370/352 |
| 7,600,007 B1 * | 10/2009 | Lewis | 709/223 |
| 7,734,765 B2 * | 6/2010 | Musman et al. | 709/224 |
| 2002/0103731 A1 | 8/2002 | Barnard et al. | 705/34 |

* cited by examiner

*Primary Examiner* — Le H Luu
(74) *Attorney, Agent, or Firm* — Baker Botts L.L.P.

(57) ABSTRACT

The present invention describes a system for automatically monitoring and managing Service Level Agreements on behalf of Service providers (such as Application Service providers). The system is based on a specialized SLA language that can translate complex or simple Service Level Agreements into measurable and controllable criterion. The system enables Application Service providers to set up customized Service Level Agreements with customers, and monitor, modify and control all aspects of these agreements, including billing, sales, Customer Relation Management, customer support and Quality of Service. The technology on which the present invention is based is a formula driven language that translates Service Level Agreement details into commands. As such these details can be tracked and processed to produce detailed reports and summaries.

18 Claims, 4 Drawing Sheets

SYSTEM AND METHOD FOR ANALYZING AND COORDINATING SERVICE-LEVEL-AGREEMENTS (SLA) FOR APPLICATION-SERVICE-PROVIDERS (ASP)

CROSS REFERENCE TO RELATED APPLICATIONS

This application is a continuation of U.S. application Ser. No. 11/105,526 filed Apr. 14, 2005 and entitled "System and Method for Analyzing and Coordinating Service-Level-Agreements (SLA) for Application-Service-Providers (ASP)", now U.S. Pat. No. 7,734,765 which is a divisional of U.S. application Ser. No. 09/714,204 filed Nov. 17, 2000 and entitled "A System Use Internal Service Level Language Including Formula To Compute Service Level Value For Analyzing And Coordinating Service Level Agreements For Application Service Providers" now U.S. Pat. No. 6,925,493.

Submitted with the application and incorporated-by-reference herein is a computer program listing appendix recorded on a compact disk.

FIELD AND BACKGROUND OF THE INVENTION

The present invention relates to a system for enabling Service providers (including NSP—Network Service Providers, ISP—Internet Service Providers, etc. and primarily ASP—Application Service Providers), hereinafter referred to ASP's, to manage Service Level Agreements (hereinafter referred to as SLA's) in a highly efficient way. The purpose of the present invention is to give ASP's a tool to define SLA's with their customers, and to enable them to monitor and execute the actual service level given to a customer according to the SLA. The way this is achieved is through the application of a language based on Service Level Agreement Language of Measurement (hereinafter referred to as SLALOM).

An application service provider (ASP) is a company that uses the Internet to offer individuals or enterprises access to application programs and/or related services, so that these programs and services do not have to be located in personal or enterprise computers. The ASP market is becoming increasingly competitive. In order to survive, ASP's are beginning to offer a wider set of services to complement their offering. Besides the application that the ASP's are providing, they are offering Help Desk, technical support, consulting, training etc.

As this market matures, customers are demanding service level agreements (SLA) as the core component of the engagement, and reports on the actual service level delivered. Different customers will have different service level needs. The ASP's will be facing the problem of providing differentiated services to different customers. Meeting the various service level expectations of its customers and allocating the sufficient amount of resources for each customer becomes increasingly complicated.

The ASP's that will survive this cutthroat competition will be those who:
  Offer tailored services to their customers
  Gain customers confidence in their service delivery
  Maintain an efficient operation The Service Level Agreements (SLA) is a contract between a network service provider, such as an ASP, and a customer that specifies what and how services will be furnished by the network service provider. Common SLA's include the following factors: What percentage of the time services will be available, the number of users that can be served simultaneously, specific performance benchmarks to which actual performance will be periodically compared, the schedule for notification in advance of network changes that may affect users, help desk response time for various classes of problems, dial-in access availability, and usage statistics that will be provided[1]. The problem, however, is that these factors are difficult to measure and control. A new generation of tools has had to be created to deal with these developments.

[1] www.gurunet.com, under Service Level Agreement

There are tools today that compute service-levels, but each of those tools defines its own idea of service-level. There are many tools that measure different measurements that are used to compute the service-level. Some of these tools can compute certain aspects of service-level, but they lack the ability to define different types of service-level computation.

There is, however, no known tool in the market today that manages service level agreements (SLA's) for Asp's. There is also no tool that measures service-level, based on definitions in the SLA. Tools that exist today enable raw measurements of resources or equipment that the ASP uses, but none of them allows a language that can describe the way to combine those raw measurements into a valuable description of the service level of a specific customer. Today, service providers that want to compute service-level that was given to a particular customer, must perform those calculations manually, using the raw measurements received from the measurement tools. This leads to very simple definitions of service-level, since more complicated definitions are very hard to compute manually.

Example of two such tools are InfoVista (httn://www.infovista.com) and NetCool (http://www.netcool.com). Both these tools, gather information about resources on a network. Netcool focuses mainly on getting failure events from the network, in order to alarm the system administrator, while Infovista's main focus is on a longer term gathering of information, in order to produce reports of an overall performance.

There is thus a widely recognized need for, and it would be highly advantageous to have a tool that allows ASP's to define different ways to automatically compute service-levels, and consequently to measure and control SLA's.

The present invention allows such flexibility and automation. The invention, referred to hereinafter as Oblicore, is a central management tool, based on a specialized Service Level Agreement Language of Measurement (SLALOM) that allows the ASP to manage all aspects of the SLA's signed with its customers and to track the actual service level delivered. Using the present invention's solution, the ASP can provide timely and reliable reports to its customers on the service level delivered, compared with the service level agreed upon in the SLA. Another feature provided by the present invention is the calculation of penalties to be credited to the customer in case the targets have not been met. The ASP that utilizes the present invention is able to optimize allocation of its resources according to customer prioritization and based on the actual service level delivered to each customer.

When the ASP industry becomes mainstream, most software applications will become commodities. For example, a company that wishes to implement a Human Resources application from PeopleSoft will be indifferent to which ASP provides it. The main difference between the offerings of different ASP's will be in their SLA's and their ability to execute their SLA—this is what customers will focus on in choosing their ASP's.

By implementing the present invention, the ASP will have a system that enables it to define its different resources in a single place. The ASP's sales staff will be able to easily tailor an SLA that suits the needs of each customer and charge more for higher level of service, without compromising the ASP's ability to meet the needs of other customers. The ASP may allow the customer to change some of the definitions in the SLA dynamically (for the right price) to accommodate the customer changing needs. Using the system of the present invention, the ASP manager will be able to identify potential customers that can be offered higher levels of service and additional services.

SUMMARY OF THE INVENTION

According to the present invention there is provided a central management tool, based on a specialized Service Level Agreement Language of Measurement that allows Service Providers (such as ASP's—Application Service Providers) to manage all aspects of the SLA's (Service Level Agreements) signed with its customers, and to track the actual service level delivered. Accordingly, the ASP can provide timely and reliable reports to its customers on the service level delivered, compared with the service level agreed upon in the SLA. Another feature provided by the present invention, hereinafter called Oblicore, is a calculation of penalties to be credited to the customer in case the targets have not been met.

The system of the present invention is based on a language that enables ASP's and users to define their own ways to compute and monitor the service-level. ASP's using such a tool will be able to define and manage much more complex SLA's with their customers, on a customized level. This tool computes service-level in such a way that it can be used by other programs to measure and control that service level. The invention allows maximum flexibility in describing those service-levels, so that each customer can describe his or her own individual method of measuring service level (or even more than one such method). The present invention provides a software means to calculate the service level of individual customers, in such a way as to provide accurately monitored and controlled customized service.

The heart of the present invention is a service-level language that contains formulas. Each such formula describes how to compute some service-level value from measurements collected by the ASP. These measurements are usually collected from various tools that measure resources the ASP uses to supply service to its customers. Each such formula, written in the language of the present invention, can be loaded into the server computer memory, and from there it may collect measurements from measurement tools, and subsequently calculate the service level. The results of these computations can be analyzed, saved and monitored. Furthermore these results can be used to generate various summaries and reports that are used to ensure the smooth maintenance of customer relations, contracts, resource allocation and system development.

BRIEF DESCRIPTION OF THE DRAWING

The invention is herein described, by way of example only, with reference to the accompanying drawings, wherein.

DESCRIPTION OF THE PREFERRED EMBODIMENT

Figure 1:
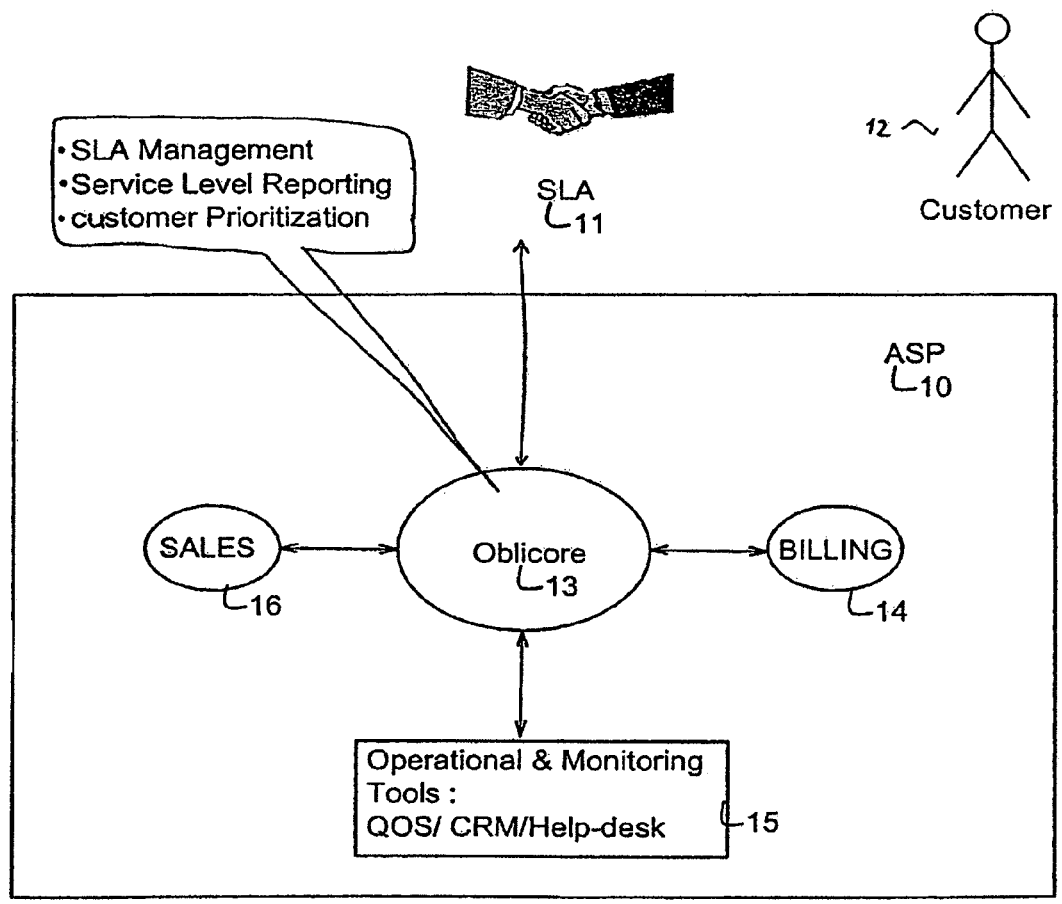
FIG. 1 is an illustration of the location of the present invention.

The present invention relates to a system for enabling Service providers (including NSP—Network Service Providers, ISP—Internet Service Providers, etc, and primarily ASP—Application Service Providers), hereinafter referred to ASP's, to manage Service Level Agreements (hereinafter referred to as SLA's) in a highly efficient way. The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention. The present invention is of a system for applying unique formulas to Application Service providers (ASP) computers, in order to effectively manage Service Level Agreements (SLA).

Specifically, the present invention can be used to allow ASP's to compute, monitor and control service-levels that it supplies to its customers, on a personalized basis.

SLA (Service Level Agreement) is a way for a service provider and a customer to set a contract that establishes the obligations of the service provider to the customer.

The purpose of this agreement is to give ASP's a tool to define SLA's with their customers and to monitor the actual service level given to a customer against the SLA.

The system supports very granular definitions of service levels: Different targets may be set for every customer, for every aspect of service level, and for every application at any point in time. Defining Service Level Agreement requires a very flexible system. The present invention's solution has been designed to meet the requirements of different ASP's providing a wide range of applications and services to disparate customers. The defining of service domains is done by the system administrator, who defines the combination of resources that should be measured for each service domain. The administrator can control the frequency of measurements performed by the monitoring tool, the frequency in which the present invention will receive the data from the monitoring tool and the rate of aggregation performed by the present invention when the information is stored in the database.

The system is based on an internal SLA language, named Service Level Agreement Language of Measurement (referred to hereinafter as SLALOM), that supports the various aspects of SLA handling: service domains, aggregation rules, penalties, etc. in a flexible manner. This language contains formulas, wherein each formula describes how to compute some service-level value from measurements collected by the ASP. These measurements are usually collected from various tools that measure resources that the ASP uses to supply service to its customers. Each such formula, written in SLA-LOM, can be loaded into the server computer memory, and from there it may collect measurements from measurement tools, and subsequently calculate the service level. The results of these computations can be analyzed, saved and monitored. Furthermore these results can be used to generate various summaries and reports that are used to ensure the smooth maintenance of customer relations, contracts, resource allocation and system development. The system administrator does not have to know this language, yet it can be used with a very intuitive and easy to use user interface.

The principles and operations of such a system according to the present invention may be better understood with reference to the drawing, and the accompanying descriptions, wherein:

Referring to FIG. 1, it can be seen how the present invention sits in between the Application Service providers and customers, managing the Service Level Agreements. The SLA 11 is the agreement signed between the ASP 10 and the customer 12. The ASP utilizes the present invention, also referred to as Oblicore 13, to automatically manage the SLA 11. The present invention 13 also manages billing 14, Quality of Service, Customer Relation Management and help-desk functions 15, and sales 16.

Figure 2:
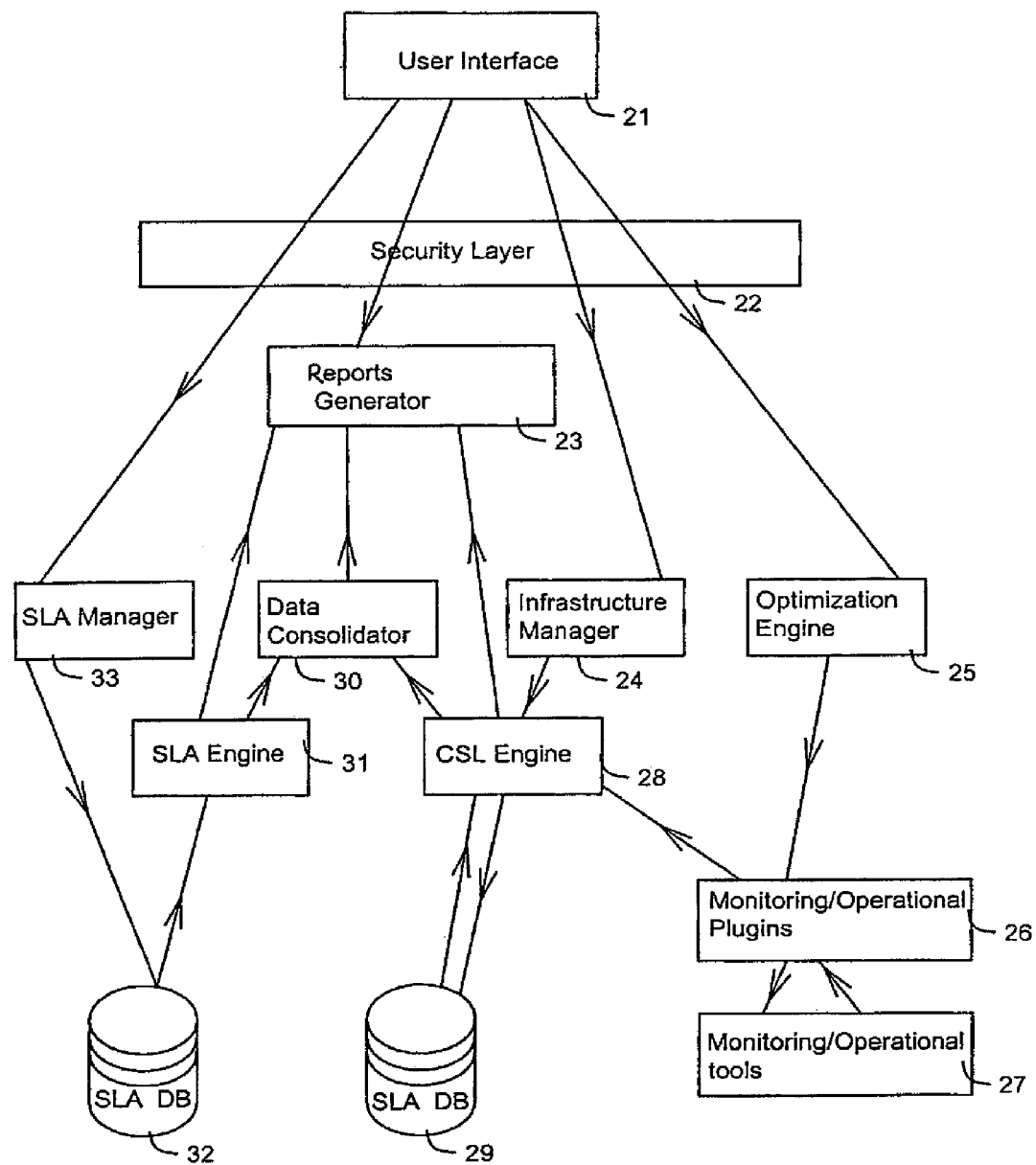
FIG. 2 is an illustration of the system architecture according to the present invention.

Referring to FIG. 2, the system is comprised of the following architectural components:

User Interface 21

The user interface 21 is multi lingual Web based interface which displays only the menus allowed for each end user according to his or her security level and role. The User interface 21 tier is a web-interface. It has been developed using ASP (Active server pages) with VbScripts.

Security Layer 22

This layer is responsible for securing the Oblicore system data by enforcing a security policy restricting users from performing operations they are not permitted to perform, and from viewing information they are not permitted to access.

SLA (Service Level Agreement) Manager 33

This component manages the administrative work of the SLA: It where relevant.

SLA DATABASE 32

This database contains the SLA definitions that target the amount of service level promised to the customer per a certain service domain, application and a certain time slot (or a group of time slots). This database contains the information that the SLA Manager uses.

SLA Engine 31

This component is responsible for processing the data in the SLA DB 32 and generating maps of the promised service level for a customer or a group of customers within a period of time or a time slot.

CSL Engine 28

This component processes the measurements and events reported by the M/O tools 27 after being translated into Oblicore resources id's by the M/O Plug-ins 26.

The information is calculated, aggregated and then stored in the CSL DB 29 reflecting the measured service level actually provided by the ASP at a certain time interval.

CSL DB 29

The CSL database 29 contains the Calculated Services Level measurements and events calculated and aggregated by the CSL engine 28. The aggregation method, as well as the aggregation time defined in the SLA DB 32 as a part of the formula of the given rule.

Data Consolidator 30

This component is responsible for processing the information from both the SLA engine 31 and the CSL engine 28 and returning the deviation of the given service from the promised one, and the penalty declared for that deviation.

Reports Generator 23

This component produces reports based on information received from the SLA engine 31 (targets), from the CSL engine 28 (actual service levels) and from the Data consolidator 30 (deviation from the promised service level).

Monitoring/Operational (M/O) Tools 27

These hardware and software tools, located outside of the Oblicore system, monitor the various ASP's resources: Network, Servers, Help desk, etc. There might be more than one M/O tool 27 since different tools can monitor different resources and can take different measurements on the same resources.

Monitoring/Operational Plug-In 26

This component plugs into a certain M/O tool 27 and translates the measurement/events from this M/O tool 27 into a uniform Oblicore message and forwards this message into the CSL engine 28. This component is independent of the Oblicore system and therefore contains a layer defining the connection to the Oblicore system (through the CSL engine 28) on the one hand and the M/O tool connection layer, which defines the method of retrieving the measurements/events from the M/O tool 27 on the other hand). The core of the plug-in translates the M/O measurement/events into Oblicore messages. The Plug-in can connect either to a Network monitoring tool or to CRM tools and in the future into Monitoring tools for consulting, training, security, etc., to include virtually all the services that may provided by the ASP to its customers.

The way the plug-in interacts with the M/O tool 27 depends on the way the M/O tool 27 functions. Some tools offer an API (application program interface), which can be accessed by the plug-in. Other ways include gathering the data from a log file or a database. If those methods are not sufficient, then information can also be gathered by screen scraping of the M/O tool management screens.

The system may include off-the-shelf plug-ins to the most commonly used M/O tools 27. An SDK will be provided for implementing plug-ins to home grown applications or rarely used tools.

Infrastructure Manager 24

This component is responsible for holding the information about the map of resources, i.e. what is the role of each resource, where is it connected, and which user/users are influenced by it. This component is crucial since it allows the system to find the resources that should be monitored for each customer, in order to compute that customer's service level.

Optimization Engine 25

This component runs sophisticated algorithms and supports "what if" scenarios that are aimed at optimizing the allocation of resources by the ASP to better meet the overall commitments of the ASP to its customers. This is in order to increase customer satisfaction and reduce penalties.

The following is an example of a SLA defined between an Application Service Provider and a specific customer:

ASP Predefinitions

As a preparation for using the system the system administrator may define general information regarding the ASP which is described below:

1) Customers. The system administrator may define in the system a list of customers and their details, or extract this information from the ASP's CRM (Customer Relationship Management) database. The Service Level Agreement's may be attached to the customers later on (it is also possible to define a new Customer while feeding in his or her SLA).

2) Customer groups. The system enables the ASP to group Customers together into logical Customer Groups. A single customer may be a member of more than one group. Multi-customer reports may be applied to a Customer Group to reflect summaries of the members' information, 3) Applications. The system administrator defines in the system a list of Applications that are provided by the ASP. This list will help attaching SLA's to specific services.

4) Application groups. A set of Applications may be defined to form a logical Application Group. The definition of Application Groups such as "Office" (Word, Excel etc.) or "ERP applications" (SAP, Oracle application etc.), may streamline the process of defining SLA's, when instead of listing many Applications, one can refer to an Application Group. Also, summary reports may be applied to an Application Group.

5) Service domains. A Service Domain (also referred as a 'Domain') is a specific aspect of the service level agreed upon in the SLA. In general, the ASP's system administrator defines the Service Domains, but Oblicore will supply a set of predefined Service Domains with the system. A Service Domain is defined by the following attributes:
a) Domain name—is used for identifying the Domain.
b) Domain description—is used for describing the Domain semantics.
c) Unit—the measurement unit that represents the semantics of the service level under this Domain (for example: seconds, percent, BPS etc.).
d) Relation to target—what would be considered a deviation from the Target—a higher service level than the Target or a lower service level.
e) Aggregation rule—what function should be applied to a set of service level indications over the Target Period, in order to calculate the measured service level over this time period (into one-value to be compared to the Target). For example: average, min, max, count, sum.
6) SLA sections. Each Service Domain is defined under a SLA Section, which is a logical group of domains, sorted by their semantics. The report generator may produce group summaries, in order to sum up the service level in all the Domains in a SLA section. For example: under the "Help desk" SLA Section one may find the "Response time of handling level 1 trouble tickets", "Response time of handling level 2 trouble tickets" and "Success of helpdesk sessions" Service domains. The Domains under a certain SLA Section do not necessarily share the same unit of measurement or semantics.
7) Infrastructure. The system administrator should enter the mapping of ASP resources allocated to customers. This Infrastructure database will enable the system to track the actual service level to a specific customer. This information can be retrieved by the system automatically from a monitoring tool, if the monitoring tool contains this information.
8) Galleries. Since many SLA's and SLA properties are defined based on a standard (Platinum/Gold/Silver/Bronze) or repeat themselves, Oblicore's system enables the ASP to define Galleries of SLA's and SLA properties, and choose from these Galleries when creating a new SLA. When choosing a template from a Gallery one will be asked to fill in some empty fields—unique details that cannot be predefined. It is always possible to modify the new item if the template doesn't totally fit. The following Galleries are available:
a) SLA's gallery—a gallery of full SLA's. Provides full templates for SLA's and enable the ASP to create a new standard SLA with the push of a button.
b) Rules gallery—a set of templates for SLA Rules (including the Domain Formula but not the Target for example).
c) Timeslots gallery—a set of predefined commonly used timeslots, such as: weekends, holidays etc.

SLA Structure

1. Customer details. The Customer may be a person or an enterprise. Oblicore will hold the Customer's basic properties in its database.
2. SLA general details:
a) Effectiveness dates. As far as a SLA is concerned, the date of creation is not necessarily the effective date. The effectiveness dates indicate exactly when the SLA is valid, and correspondingly when it is invalid.
b) Storage periods. Two periods defining the durability of the two data storages of the system:
c) Raw data storage—minimally aggregated service level data, by which the system is able to provide low level drilldowns into the service level provided to the Customer; very expensive with storage resources.
d) Aggregated data storage—maximally aggregated service level data, by which the system is able to provide high level reports (deviations, penalties, averages etc.); These may be kept for long terms, when storage resources are concerned.
3. Locale—specific details as for the locality of the Customer under this SLA. It contains the following parameters:
Language
Currency
Time zone
Daylight saving time
Date format
Number format
4. Applications allocation. The ASP should define which Applications or Application Groups would be provided to a Customer under a certain SLA.
5. Timeslots definition. In order to define different service level objectives per different time slices, an SLA should contain a well defined set of Timeslots, of two types:
A weekly timeslot—a collection of time ranges, contiguous or non-contiguous, in a resolution of 10 minutes, within a week. No specific dates are defined within such a Timeslot.
A yearly timeslot—a collection of specific dates, contiguous or non-contiguous, and collection of time ranges (in a resolution of 10 minutes), contiguous or non-contiguous. In general, whenever a specific point of time falls into both a yearly Timeslot and a weekly Timeslot—the yearly Timeslot is in effect.
6. Rules definition. A Rule is a combination of several parameters, defining together a service level objective for a certain service, in a certain time. The Rule also defines the Penalty for deviations from the agreed service level. No two Rules are allowed to exist at the same time, regarding the same exact service (same Application, same Service Domain). A Rule is defined by the following parameters and attributes:
Rule name—makes it easy to recognize the specific Rule.
Rule description—makes it easy to understand the Rule's semantics.
Service domain—each Rule is attached to one Service Domain. The Domain imposes the semantics of the service objective defined by the Rule, and therefore the unit of measurement and the meaning of deviation from the Target. The method of calculating the provided service level is determined specifically for each Rule by the Domain Formula.
7. Domain formula—a complex formula describing the exact method of calculating the actual service level under the relevant Domain. Different Customers and ASP's may measure service level differently in general, or even differently for various Timeslots and Applications within the same SLA. Therefore the exact method of processing the measurements is defined on a Rule basis. The formula also defines the needed frequency of the various measurements participating in the service level calculation, and the resolution of the calculated service level storage (Raw Data Storage).
8. Related applications—the Applications (or Application Groups) to which this Rule applies. Thanks to this, different service objectives may apply to different Applications.

If no Application is related to the Rule—it holds for al the Applications provided to the Customer under the specific SLA.

9. Related timeslots—the Timeslots to which this Rule applies, i.e.—when does this Rule hold. Overlapping Timeslots (of the same form: weekly or yearly) are allowed within the same Rule. If no Timeslot is related to the Rule—it holds permanently by default.
10. Target—This is the promised service level for the applied Timeslots and Applications. The Target is to be tested each Target Period. The unit of the Target is inherited from the Domain definition.
11. Target period—a time interval to which the Target is related as a whole. In other words—for each Rule, once every Target Period, the provided service level is calculated and checked against the Target to calculate deviations from the agreed and/or Penalties.
12. Penalty formula—a compound formula defining the amount of money to be credited to the Customer as a Penalty for deviations from the promised service level once every Target Period. The formula is based on mathematical operations on the Target, the provided service level within the Target Period, and the ratio between the two. Also, the formula may contain cases and conditions to refine the Penalty rate. Remark: if the ASP doesn't use Penalties, this option will be hidden.

SLA Example

In this example, the actual definitions are in the gray boxes. The italic text is just a more readable (human language) explanation of the gray boxes.

The service level agreement is signed between the ASP and Alladin Lamps and assoc. (any company) The SLA is for the period between Feb. 10, 2001 and Feb. 9, 2002.

Customer: Aladdin Lamps and assoc.

Effective date: Feb. 10, 2001

Expiration date Feb. 9, 2002

According to the agreement, Raw measurement data will be stored for the period of one month. For periods longer than one month, aggregated measurement data will be stored. The aggregated data will be stored for the period of 15 months.

The data will be presented to the user of this SLA using the format of the USA/CA locale Raw data storage period: 1 month Aggregated data storage period: 15 months Locale: USA/CA This agreement concerns the following three applications/ Application Groups: Office, SAP, Remedy. Applications: Office, SAP, Remedy.

Timeslots:

Three different timeslots are defined in this agreement.

1. Weekly timeslot: Weekdays Monday through Friday 8 am to 5 pm.
2. Weekly timeslot: Weeknights Monday through Friday 5 pm to 8 am.
3. Yearly timeslot: New Year Dec. 31, 2001 through Jan. 1, 2002.

The following rules describe the main points agreed between the ASP and the customer, as to the service level the ASP should provide the customer with.

Rules a) Name: Weekdays uptime

During Weekdays, the uptime of the system will be no less than 98%. In case the ASP will not satisfy this requirement, it will pay the customer a penalty according to the penalty formula described later. For calculating the uptime, the system will be considered UP when at least one web server and one application server and two routers are up. All the resources will be sampled each ten seconds. The system will allow drill down information up to the resolution of ten minutes. The aggregation of the data is done by using the average function.

b) Service domain Uptime (aggregation rule average).
c) Domain formula at least 1 web server, one application server and two routers of the customer are up when measuring once every 10 seconds. Write into the CSL the percentage of the measurements that resulted true-out of all the measurements within each 10 minutes.
d) Related applications: SAP, Excel, Remedy.
e) Related timeslots: Weekdays
f) Target: 98%
g) Target period: 1 day.
h) Penalty formula: In case of deviation of 0 to 20 percent: penalty=$0.3*deviation per seat. In case of deviation of more the 20 percent: penalty=$1 per seat
i) Name: Weekdays min uptime for Word
j) Service domain: Minimal uptime (aggregation rule: min).
k) Domain formula: at least 2 web servers, one application server and one router of the customer are up when measuring once every 20 seconds. Write into the CSL the percentage of the measurements that resulted 'true' out of all the measurements within each 10 minutes.
l) Related applications: Word
m) Related timeslots: Weekdays
n) Target: 82%
o) Target period: 1 month.
p) Penalty formula: penalty=30$+(100-provided service level)*2$.

Figure 3:
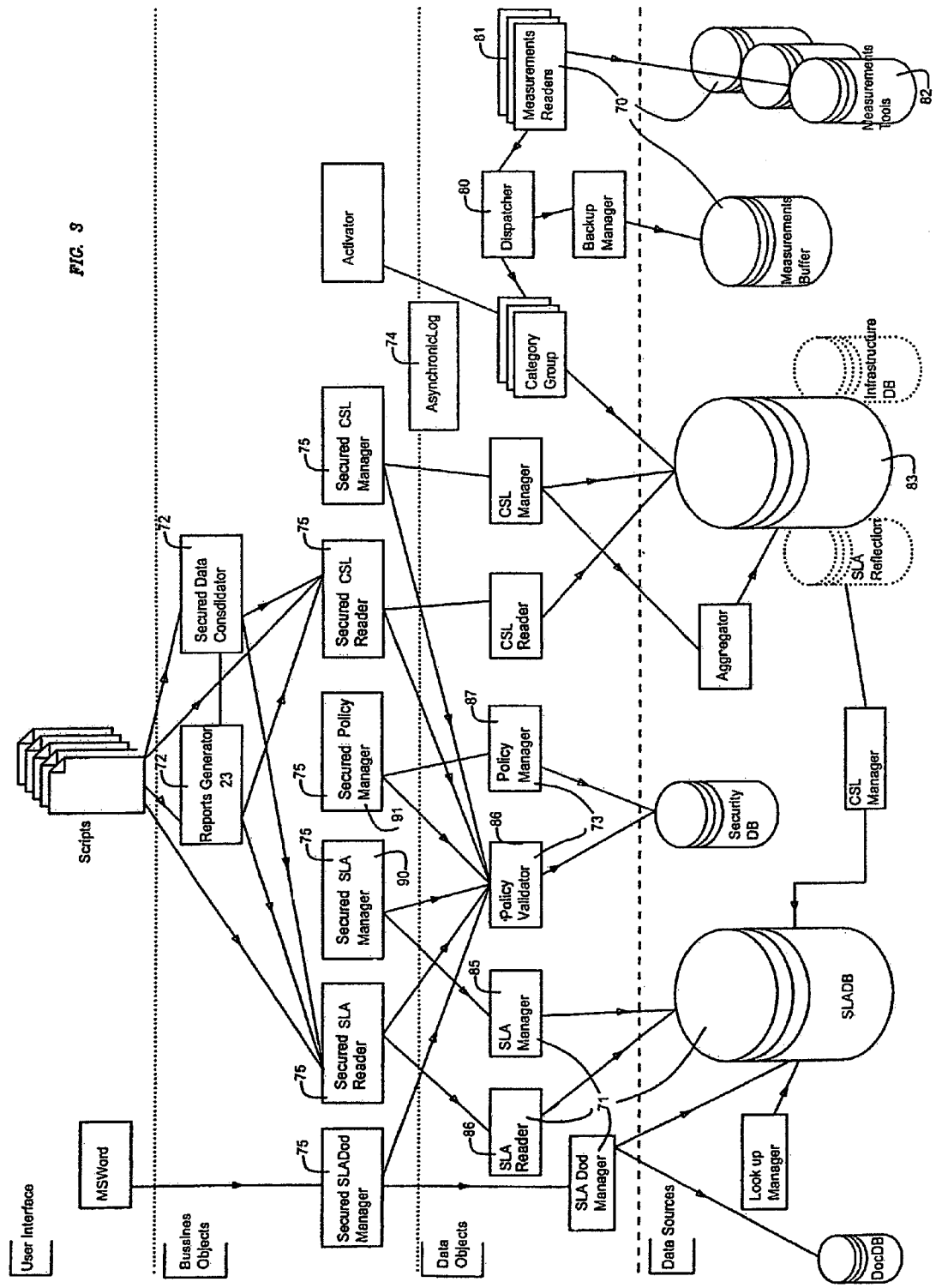
FIG. 3 is a flow chart representing the 3-tier structure of the present invention.

Referring to FIG. 3, the 3-tier-structure system of the present invention is illustrated.

1. User interface tier 40 is a web-interface. It has been developed using ASP (Active server pages) with VbScripts. This is represented by the GUI interface.
2. Business logic tier 50 has been developed using C++, as COM objects. This is represented by the Business Objects.
3. Database tier 60 is a standard relational SQL. An Oracle DB is currently being used. This is represented by the Data Objects 61 and Data Source 62 sections of FIG. 3.

As can be seen in FIG. 3, the system consists of the following main subsystems, which are described below:

Measurement sub-system 70
SLA sub-system 71
Reports sub-system 72
Policy sub-system 73
Logging sub-system 74
Secured level 75

The Present Invention Includes the Following Modules

Figure 4:
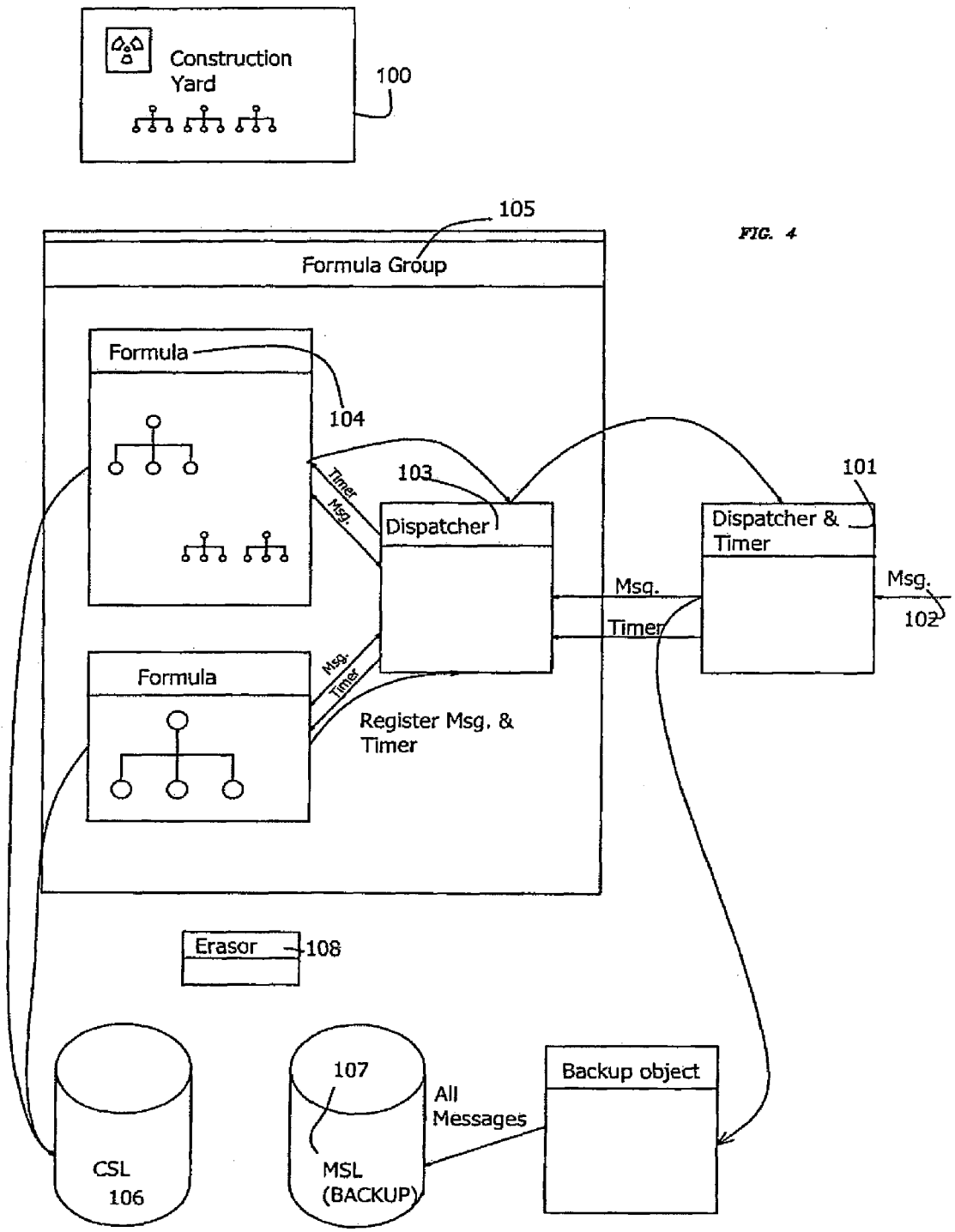
FIG. 4 illustrates additional system components in the construction yard.

There are several modules or sub-systems that comprise the present invention. These modules, as can be seen from FIG. 3, work in cooperation in order to run the system. It is recommended to look at FIG. 3 as well as FIG. 4 in order to follow the following descriptions. FIG. 4 illustrates additional system components in the construction yard 100.

Measurement Sub-System 70

Main Purposes of the Sub-System:

Collect measurements from external information sources.
Normalize measurements to unified form.
Calculate and store service level information according to SLF, operated on the received measurements.

Methodology:

The sub-system includes Readers components. Each such reader is responsible of communicating with a specific information source, collecting measurements from the information source, normalizing the measurements to the unified form called messages and sending them to the External Dispatcher 101.

The External Dispatcher 101 receives messages 102 from the Readers, and sends them to the Internal Dispatchers 103 that registers those messages to the objects that may register for receiving specific type of measurements.

For each service level formula 104, the Formula Construction Yard 100 creates a Formula object grouped by the formula group 105. The formula object holds the tally for making a CSL record from the messages that arrived. Each formula object registers itself in his Internal Dispatcher 103 for the relevant messages and the last one registers the messages in the External Dispatcher 101. The formula object receives the messages from the Internal Dispatcher 103, calculates the service level according to the formula 104, and store it in the database.

The External Dispatcher 101 is responsible for controlling and timing the operations of the Formula objects.

Measurement Tool 82:

This software monitors the resources on the network, and is capable of querying them for different parameters. There might be more than one measurement tool since different tools can measure different resources or even different measurements on the same resource.

Oblicore 1.5 Release is dedicated to one Measurement tool called XACCT.

Reader 81:

The Measurement Reader 81 gets measurements and events from the Measurement Tool 82, translates them to a uniform measurement record and sends them forwards to the Dispatcher 80 on the Oblicore Server.

Every Measurement Reader 81 has a layer specifically configured for the Measurement tool 82 that the reader is designed for.

The layer describing the connection between the Reader 81 and the Dispatcher 80 on the Oblicore Server is the same for all the Readers.

The differences between the Readers will be in the Measurement tool Connection layer and in the configuration of the filtering and translation of the data form the Measurement tool 82 to Oblicore.

External Dispatcher 101:

The external dispatcher 101 is responsible to receive all the messages 102 from the readers 81, and forward them to those formula groups 105 that need them. But the dispatcher 80 does more than this. It is also responsible for arranging the arriving messages in the right (chronological) order, so that the formula groups can assume the messages arrive in the same order they were created. Another role of the dispatcher 101 (as can be guessed from its name in the drawing) is to create timer events. As mentioned earlier, the dispatcher 101 forwards the messages 102 it receives to those formula groups 105 that need them. It may be asked, how does the dispatcher 101 know where should he forward the message? Another rather curious question is how does it know what timer events are needed. The answer to both of those questions is that formula groups that want to receive some message or timer event, must register that desire with the dispatcher 101. Moreover, when a formula group 105 does not want to receive some message any more, it must un-register this message at the dispatcher 101. The dispatcher 101 receives messages from many readers. Each reader may run on different machine, and receive its measurements from different measurement tools 82. This might cause a situation where messages arrive to the dispatcher 101 in a different order than the order they were created. The dispatcher 101 must be able to arrange those messages in the chronological order before forwarding them. This is done by maintaining a priority queue of messages waiting to be forwarded, and delaying each message in that queue for a couple of minutes. This way when a message arrives one minute later than it should have, the messages that were created after it still wait in the queue, and this message can be sent before them.

Another important role of the dispatcher 101 is to serve as the main timer of the system. Each formula group 105 that wants to receive timer events each specified amount of time, registers that timer event with the dispatcher 101. In order to create those timer events, the dispatcher 101 does not use a real clock, but rather watches the time stamps on the arriving messages, and uses them to measure the time.

This way the timer events arrive synchronized with the messages.

Formula Groups 105:

Formula groups 105 are the objects that receive the messages from the dispatcher 101. Each such group contains an internal dispatcher object 103, and many formula objects 104. Each formula group object 104 runs on a single computer in a single process, but there might be many such formula groups, and each can run on a different computer. This makes the system more scalable since the formula group might be CPU demanding.

Internal Dispatcher 103:

The internal dispatcher 103 object is very similar to the external dispatcher object 101. It receives messages from the external dispatcher 101 and forwards them to those formula objects 104 that need it. Each formula object 104 that wants to receive some kind of message, must register that message with the internal dispatcher 103. The internal dispatcher 103 must then register this message with its external brother (the internal dispatcher registers each message with the external one only once and not for each formula). When a formula unregistered some kind of message with the internal dispatcher 103, the dispatcher is responsible to un-register this message with the external dispatcher 101 if no other formula needs it.

Formula 104:

A formula object 104 represents a calculation made on the measurements and saved to CSL 106. The formula is a tree, constructed from a formula written in SLL language (also known as SLALOM); and which is saved in the SLA database. Each formula object needs many different measurements in order to perform its calculation. When the formula object 104 is constructed, it must register each such measurement with the internal dispatcher 103, and from that moment each such measurement will be dispatched to the right node in the formula tree.

The construction yard object does the construction of the formula objects from the text of the formula.

CSL Database 83:

The CSL database 83 (some call it RSL) contains Calculated Service Level measurements. Each measurement is aggregation of some simple measurements from the measurement tools. The aggregation method, as well as the aggregation time is defined in the formula objects 104. Each record is either aggregated over a given amount of time (such as 10 minutes), or in some other way (such as from one failure to another).

Each record in the CSL 106 contains the following fields:
From time—the beginning of the time period this record represents.
To time—the end of this period.
Formula ID—the id of the formula that wrote this record
val1, val2, . . . , val5—five values that can be calculated by the formula (most formulas will calculate only one of those values.

Backup 107:
The backup object is used to perform backup of the measurements. The backup is done for three main reasons:
  In order to restore the state of the formula objects in case of a crash.
  In order to allow the user a drill down to the level of the raw measurements.
  For debug purposes.
The backup object registers itself with the dispatcher to receive all the messages (including all the timer messages). Then, upon receiving those messages the backup object stores them to the MSL database. Restoration of each formula state is done as following:
  Retrieving all the messages from the MSL 107 that came after the last timer event, and sending them to the formula.
ERASeR 108:
This Module is responsible for deleting old records from the CSL database 83.
The time limitation on CSL record defined in the SLA by the user how determined for how long to save the detailed measurements.
This module activated automatically every X time and removing all the records connected to formula object that contains the time limitation value.

SLA Sub-System 71
Main Purposes of the Sub-System:
  Allow the manipulation of SLA's, including insertion of new SLA's to the system, viewing and updating existing SLA's.
  Allow the manipulation of all SLA related data, such as customers, applications, domains, time-slots, formulas, etc.
  Supply information about SLA's for reporting components.
Methodology:
  An SLA is composed of a set of RULES, where each RULE defines a specific service level requirement.
  A RULE is composed of the following elements:
    An aggregation rule that defines the way that single service levels of a number of time slices are aggregated to form a service level over a period of time.
    An aggregation rule is one of the functions sum, avg, weight_avg, min, max and count. The aggregation rule is operated on a specific SLF.
    A target for service level.
    The relation between the service level and the target.
    The period of time that the target relates to.
    The TIME-SLOTs that the rule applies to.
  For example, to represent the requirement that "The average uptime on weekdays will be above 98%, on a hour basis calculation", the following data is needed:
SLF=UPTIME
RULE=avg
TARGET=98
RELATION=>
TIME_SLOT=weekdays
CALC_PERIOD=1 hour
Components:
SlaManager 85:
  Supply methods for manipulation of SLA's, including insertion of new SLA's to the system, viewing and updating existing SLA's.
AdminManager:
  Supply methods for manipulation of all SLA related data, such as customers, applications, domains, time-slots, formulas, etc.
SlaProcessor:
  Supply information about SLA's for reporting components.
  SlaReader 86 will be able to answer questions like:
    "What is the service level promised to customer x, in domain y, during time slot z"
    "What are the service levels promised to customer x, in application y domain z, during period t1-t2"
Reports Sub-System 72
Main Purposes of the Sub-System:
  Produce system reports and graphs
Methodology:
  Reports sub-system 72 gathers information about SLA's and CSLs and produces various reports, graphs, summaries and analysis.
  Generation of a report/graph is done in 2 phases:
    Gathering information (From SlaProcessor and/or CslProcessor)
    Using an external reporting tool to produce the output.
Components:
ReportsGenerator 23:
  Supply methods for producing all available reports.
DataConsolidator 30:
  Supply methods for retrieving summarized information about deviations and penalties.
Policy Sub-System 73
Main Purposes of the Sub-System:
  To allow setting a security policy that determine what operation may user, or group of users perform.
  To supply online policy validation for secured components.
Methodology:
  Manages users, groups and authorizations
  Each user can belong to a number of groups (or none)
  A user can be given authorizations for specific operations.
  A group can be given authorizations for specific operations.
  A user is permitted to perform an operation if either he, or one of the groups that he belongs to have the authorization for the operation.
Components:
PolicyValidator 86:
PolicyManager 87:
Logging Sub-System 74
Main purposes of the sub-system:
  Supply a logging mechanism for all other sub-systems
Methodology:
Components:
Logger:
Secured Level Sub-System 75
Main purposes of the sub-system:
  Supply secured access for system components
Methodology:
  For every component that needs secured access, a parallel secured component should be developed. The secured components supply the same interface as the parallel unsecured component wraps the component and add security validation before activating any function.
  The secured components use the PolicyValidator, of the Policy sub-system to validate operations.
Components:
SecuredSLAProcessor
SecuredSLAAdminManager
SecuredSLAManager 90
SecuredPolicyManager 91
SecuredCSLProcessor
SecuredInfrastructureManager As seen in FIGS. 2 and 3, the reports generator 23 generates both reports and summaries as follows:

Reports

The system enables the generation of highly detailed and specific reports for various dimensions of system activity. These reports are generated by the Reports Generator 23, in the Business Objects 50 section of the system. Following is a list of reports to be included in the system:

Single SLA Reports

Agreed service level of a certain domain [and a certain application] over a period of time.

Agreed service level for each timeslot [relevant to a period of time] of a certain domain [and a certain application].

Provided service level of a certain domain [and a certain application] over a period of time.

Provided service level of a certain timeslot in a certain domain [and a certain application] over a period of time.

Agreed vs. provided service level of a certain domain [and a certain application] over a period of time.

Agreed vs. provided service level of a certain timeslot in a certain domain [and a certain application] over a period of time.

Agreed vs. provided service level for each timeslot [relevant to a period of time] of a certain domain [and a certain application].

Deviation from the agreed service level of a certain domain [and a certain application] over a period of time.

Deviation from the agreed service level in a certain timeslot in a certain domain [and a certain application] over a period of time.

Penalty for deviation from the agreed service level of a certain domain [and a certain application] over a period of time.

Penalty for deviation from the agreed service level in a certain timeslot in a certain domain [and a certain application] over a period of time.

Deviation from the agreed service level in each domain in a certain SLA section over a period of time. Penalty for deviation from the agreed service level in each domain in a certain SLA section over a period of time.

Penalty for deviation from the agreed service level for each SLA section over a period of time.

Domains Reports

Average/minimum/maximum/variance of agreed service level for each domain [for a certain application] over a period of time (for all the customers).

Average/minimum/maximum/variance of deviation from agreed service level for each domain [in a certain application] over a period of time (for all the customers).

Average/minimum/maximum/variance of penalty for deviation from agreed service level for each domain [for a certain application] over a period of time (for all the customers).

Application Reports

Average/minimum/maximum/variance of deviation from agreed service level for each application [in a certain domain] over a period of time (for all the customers).

Average/minimum/maximum/variance of penalty for deviation from agreed service level for each application [in a certain domain] over a period of time (for all the customers).

Customers Reports

Provided service level of a certain domain [and a certain application] for each customer over a period of time.

Deviation from the agreed service level of a certain domain [and a certain application] for each customer over a period of time.

Penalty for deviation from the agreed service level of a certain domain [and a certain application] for each customer over a period of time.

Deviation from the agreed service level of a certain SLA section [and a certain application] for each customer over a period of time.

Penalty for deviation from the agreed service level of a certain SLA section [and a certain application] for each customer over a period of time.

Overall Reports

Average/minimum/maximum/variance of deviation from agreed service level [in a certain application] over a period of time (for all the customers, all domains).

Average/minimum/maximum/variance of penalty for deviation from agreed service level [in a certain application] over a period of time (for all the customers, all domains).

Penalty for deviation from the agreed service level for each of the N most mal-treated customers over a period of time (all the domains, all the applications).

Summaries

Per-SLA Summaries

Average/minimum/maximum/variance of agreed service level in a certain domain [and a certain application] over a period of time.

Average/minimum/maximum/variance of provided service level in a certain domain [and a certain application] over a period of time.

Average/minimum/maximum/variance of provided service level in each timeslot of a certain domain [and a certain application] over a period of time.

Average/minimum/maximum/variance of deviation from service level of a certain domain [and a certain application] over a period of time.

Average/minimum/maximum/variance of deviation from service level in each timeslot of a certain domain [and a certain application] over a period of time.

Average/minimum/maximum/variance of penalty for deviation from service level of a certain domain [and a certain application] over a period of time.

Average/minimum/maximum/variance of penalty for deviation from service level in each timeslot of a certain domain [and a certain application] over a period of time.

Per-Domain Summaries

Updated list of top mal-treated customers in each domain.

Updated list of top well-treated customers in each domain.

Per-Application Summaries

Updated list of top mal-treated customers of each application.

Updated list of top well-treated customers of each application.

Overall Summaries

Manager' report: total penalty for all customers (each from it's last payment date), mal-treated customers (penalty or deviation), well treated customers (penalty or deviation), penalty/deviation for each SLA section.

Advantages of the Present Invention

Application Hosting and Network Bandwidth:

Quality of Service (QOS) systems enable the utilization of bandwidth according to a predefined set of rules. Load balancing systems enable intelligent utilization of several machines in order to run several applications at once. Systems such as these will benefit from being integrated with the SLA layer. The SLA layer will be able to maintain the correct level of service in real time. Instead of predefined rules, the Optimization engine will be able to monitor the current state of the system and to decide on the preferred configuration that meets the different SLA's in the most optimal way. The most important input for these decisions is the actual fee charged for services delivered at, above, or below the agreed upon service target. For example, during a time of high network contingency it's clear that customers which should receive reduced bandwidth are those for which the ASP will incur the least financial damage.

Marketing and Sales:

When the ASP industry becomes mainstream, most software applications will become commodities. For example, a company that wishes to implement a Human Resources application from PeopleSoft (http://www.peoplesoft.com) will be indifferent to which ASP provides it. The main difference between the offerings of different ASP's will be in their SLA's and their ability to execute their SLA—this is what customers will focus on in choosing their ASP's. By implementing Oblicore, the ASP will have a system that enables it to define its different resources in a single place. The ASP's sales staff will be able to easily tailor an SLA that suits the needs of each customer and charge more for higher level of service, without compromising the ASP's ability to meet the needs of other customers. The ASP may allow the customer to change some of the definitions in the SLA dynamically (for the right price) to accommodate the customer changing needs. Using Oblicore system, the ASP manager will be able to identify potential customers that can be offered higher levels of service and additional services. The ASP may charge more Technical Support:

Customer Relationship Management (CRM) systems provide the ASP with a way to manage all aspects of its interaction with its customers, particularly in conjunction with help desk and technical support. The SLA layer will provide input to the CRM system, both in terms of customer prioritization and SLA targets. For example, the SLA layer will provide information on how quickly calls should be answered for each customer.

Reporting:

The system provides detailed and up-to-the-minute reports on various aspects of service levels delivered to each customer compared with service level guaranteed including penalties if incurred. The reports can be accessed by the customer using any Web Browser. The level details presented by the system to the customer is defined by the system administrator. These reports serve as a very important factor in increasing the confidence of the customer in his service provider.

Billing:

Based on the actual service level delivered, Oblicore performs a monthly calculation of penalties to be credited to each customer for all the service aspects agreed to in the SLA. This information is passed to the ASP's billing system.

ASP Management:

Because of Oblicore's tight integration with the different services that the ASP offers, the ASP manager is able to obtain a broad overview of operations at all service levels. This will enable the manager to control the different aspects of the operation and to optimize resources. Oblicore does not focus on building the peripheral systems, but instead are focused on creating a robust infrastructure that support these systems and future systems.

GLOSSARY

The following terms are defined for the purposes of this document:

Domain—a logic category for grouping rules. All the targets of a domain share the same unit, and therefore may be compared.

Formula—a compound expression representing the method of calculating a single CSL value out of different messages of different resources.

Measurement—a value representing a status of a resource.

Event—a value representing a change of a resource's status.

Message: an event or measurement, formatted into a unified structure and runs through the system.

CSL Value—a value representing a category of service level, at a certain time period. It is calculated by a single formula, and is used as the basic unit of an aggregation rule.

Resource—a measurement's subject—usually a hardware component or an object of external interfaced software.

Indication—a measurement's predicate—the specific question posed to the resource by the Measurement Tool.

Infrastructure—the map of ASP's resources, their relations and allocations to customers and applications.

Customer—a person or an enterprise potentially connected to the ASP by an SLA.

User—a person who potentially logs into the system through his or her web browser. Users may be the customers' end users, the ASP's staff or others. Each user obtains a login password, by which he/she is granted permissions in the system.

ASP Domain—a group of users defined by their organizational identification. For example—all the ASP staff is of the same ASP domain, whereas a customer's end users are of another.

Application—software provided to customers by the ASP. An application may function as a resource, be involved in formulas, or may be considered a logical category for grouping SLA rules.

SLA Rule—an outline of a commitment to a customer as for the service level it shell obtain under a certain domain, application and timeslot, and the methods of measuring this service level.

Aggregation rule—a function defining the way of calculating a periodic service level out of a set of CSL values.

Measurement tool—an interfaced application used for gathering measurements and events.

SLA—Service Level Agreement—a collection of definitions as for the service level promised to a certain customer.

Timeslot—a collection of time spans outlining a compound time period, in which a certain service level is required. Timeslots differentiate between SLA rules.

Time Span—a contiguous period of time.

Penalty—compensation paid by the ASP to the customer for deviating from service level commitments.

Compensation—extra payment added by a customer to the periodic pay to the ASP, if a certain target has been exceeded positively (i.e.—a better service than required has been given).

Target—the quantity of service level promised to a customer at a specific time slot and under a certain service category.

Target Period—a time interval ("month", "day" etc.) at which the target service level is required. The target period dictates the penalty period (i.e.—how often the measurements should be summarized and compared to a target in order to calculate the periodic deviation and penalty).

Formula Frequency—an interval indicating how often a CSL value should be calculated and written into the database.

Other embodiments of the present invention include being used in any tool or system that measures service-level, or any other calculation based on measurements performed on resources. It can be used in tools that perform such calculations not only for ASP's, but for ISPs, or for any other service provider that has some automatic tools that measure its resources.

While the invention has been described with respect to a limited number of embodiments, it will be appreciated that many variations, modifications and other applications of the invention may be made.

What is claimed is:

1. A method, comprising:
receiving a measurement for a service;
calculating, using a processor, a service level value from the measurement, the service level value calculated according to a formula indicated by a Service Level Agreement;
applying an aggregation rule to the service level value to yield an actual service level;
comparing the actual service level to a target service level of the Service Level Agreement;
returning an amount of deviation between the actual service level and the target service level; and
calculating a penalty if the amount of deviation indicates the actual service level fails to meet the target service level, the penalty calculated from a penalty formula that includes the amount of deviation as an input.

2. The method of claim 1, wherein the measurement describes the status of a resource, a performance level of a process, or a status of a trouble ticket.

3. The method of claim 1, wherein:
the aggregation rule includes a time period and an aggregation function; and
the applying the aggregation rule comprises aggregating the service level value with one or more other service level values according to the aggregation function, the one or more other service level values corresponding to the time period of the aggregation rule.

4. The method of claim 1, wherein:
the aggregation rule includes an aggregation function selected from the group consisting of a sum, an average, a weighted average, a minimum, a maximum, and a count.

5. The method of claim 1, wherein the Service Level Agreement includes:
an application supported by the service; and
a timeslot indicating when to apply the target service level.

6. The method of claim 1, wherein the Service Level Agreement includes:
one or more timeslots indicating when to apply the target service level, at least one of the one or more timeslots including weekday daytimes, weekday evenings, weekends, or holidays.

7. The method of claim 1, further comprising:
selecting the Service Level Agreement from a plurality of candidate Service Level Agreements by mapping the measurement to a requirement of the Service Level Agreement.

8. A method, comprising:
receiving a measurement for a service;
calculating, using a processor, a service level value from the measurement, the service level value calculated according to a formula indicated by a Service Level Agreement;
applying an aggregation rule to the service level value to yield an actual service level;
comparing the actual service level to a target service level of the Service Level Agreement;
returning an amount of deviation between the actual service level and the target service level; and
upon a determination that the actual service level deviates from the target service level by more than an optimal amount, allocating or deallocating resources to optimize the amount of deviation between the actual service level and the target service level.

9. The method of claim 8, further comprising:
reporting a penalty if the amount of deviation indicates the actual service level fails to meet the target service level.

10. A system, comprising:
an interface operable to:
receive a measurement for a service; and
one or more processors operable to:
calculate a service level value from the measurement, the service level value calculated according to a formula;
apply an aggregation rule to the service level value to yield an actual service level;
compare the actual service level to a target service level of a Service Level Agreement;
return an amount of deviation between the actual service level and the target service level; and
calculate a penalty if the amount of deviation indicates the actual service level fails to meet the target service level, the penalty calculated from a penalty formula that includes the amount of deviation as an input.

11. The system of claim 10, wherein the measurement describes the status of a resource, a performance level of a process, or a status of a trouble ticket.

12. The system of claim 10, wherein:
the aggregation rule includes a time period and an aggregation function; and
applying the aggregation rule comprises aggregating the service level value with one or more other service level values according to the aggregation function, the one or more other service level values corresponding to the time period of the aggregation rule.

13. The system of claim 10, wherein:
the aggregation rule includes an aggregation function selected from the group consisting of a sum, an average, a weighted average, a minimum, a maximum, and a count.

14. The system of claim 10, wherein the Service Level Agreement includes:
a timeslot indicating when to apply the target service level.

15. A system, comprising:
an interface operable to:
receive a measurement for a service; and
one or more processors operable to:
calculate a service level value from the measurement, the service level value calculated according to a formula;
apply an aggregation rule to the service level value to yield an actual service level;

compare the actual service level to a target service level of a Service Level Agreement;

return an amount of deviation between the actual service level and the target service level; and upon a determination that the actual service level deviates from the target service level by more than an optimal amount, allocate or deallocate resources to optimize the amount of deviation between the actual service level and the target service level.

16. The system of claim 15, the one or more processors further operable to:

report a penalty if the amount of deviation indicates the actual service level fails to meet the target service level.

17. A method, comprising:

receiving a measurement for a provided service;

accessing a plurality of Service Level Agreements, each Service Level Agreement including:
 a target service level for one or more agreed services; and
 a formula for calculating an actual service level;

repeating for each Service Level Agreement:

determining whether the provided service corresponds to one or more of the agreed services, and if the provided service corresponds to one or more of the agreed services:

inputting the measurement into the formula to calculate the actual service level;

comparing, using a processor, the actual service level to the target service level;

returning an amount of deviation between the actual service level and the target service level; and calculating a penalty if the amount of deviation indicates the actual service level fails to meet the target service level, the penalty calculated from a penalty formula that includes the amount of deviation as an input.

18. The method of claim 17, the determining whether the provided service corresponds to one or more agreed services further comprising:

determining whether the formula of the each Service Level Agreement includes the measurement as an input.

* * * * *